United States Patent
Cameron et al.

(12)
(10) Patent No.: US 6,222,916 B1
(45) Date of Patent: Apr. 24, 2001

(54) METHOD AND APPARATUS FOR INTRODUCING AND MODIFYING TELECOMMUNICATIONS SERVICES

(75) Inventors: Duncan Cameron; Tomas Aurell, both of Montreal; Philippe Belanger, Fabreville, all of (CA)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/083,508

(22) Filed: May 22, 1998

(51) Int. Cl.[7] .................................................. H04M 3/42

(52) U.S. Cl. .................... 379/207; 707/103; 709/202; 709/203

(58) Field of Search ............................ 379/207; 707/101, 707/102, 103, 104, 10; 709/300, 303, 304, 302, 202, 201, 203, 220–226, 249–252

(56) References Cited

U.S. PATENT DOCUMENTS

| | | | |
|---|---|---|---|
| 5,193,110 | 3/1993 | Jones et al. ............................ | 379/201 |
| 5,297,285 | 3/1994 | Abrahamsson et al. ............. | 709/331 |
| 5,339,430 | 8/1994 | Lundin et al. ........................ | 709/332 |
| 5,388,258 * | 2/1995 | Larsson et al. ...................... | 707/104 |
| 5,517,562 | 5/1996 | McConnell ............................ | 379/207 |
| 5,555,418 | 9/1996 | Nilsson et al. ........................ | 717/10 |
| 5,572,727 * | 11/1996 | Larsson et al. ...................... | 707/200 |
| 5,627,888 | 5/1997 | Croughan-Peeren ................. | 379/201 |
| 5,860,004 * | 1/1999 | Fowlow et al. ........................ | 717/1 |

(List continued on next page.)

FOREIGN PATENT DOCUMENTS

WO 95/23483   8/1995   (WO) .

OTHER PUBLICATIONS

Fletcher et al. (U.S. Statutory Invention Registration No. H1,837), Feb. 2000.*

H. Sunaga, et al., "Noses Distributed Communication Switching Software Structure Based on Corba" IEEE, Jun. 8, 1997; pp. 760–764.

P. Kemppainen, et al., "Open Service Node for Intelligent Networks " Proceedings fo the IFIP TC6 Conference on Intelligent Networks and New Technologies, Aug. 30, 1995, pp. 84–94.

K. Start, et al., "The Distribution Management of Service Software " *Computer Standards and Interfaces*, Jun. 1995, pp. 291–301.

H. Matsumura, et al., "Highly Reliable On–line Partial File Modification for Office Data Provisioning in 'NOSES'" IEEE, Nov. 28, 1994, pp. 1238–1242.

PCT International Search Report mailed Sep. 23, 1999.

*Primary Examiner*—Ahmad Matar
*Assistant Examiner*—Benny Q. Tieu
(74) *Attorney, Agent, or Firm*—Jenkens & Gilchrist

(57) ABSTRACT

A telecommunications service node includes a multi-level architecture comprising an operating system layer interfaced using a compile time linked interface to a service framework layer, and a service application layer interfaced using an object oriented, run time linked interface to the service framework layer. Run time linking of the service applications supports the introduction or modification of service applications during run time execution of the service node. Each service application inherits from the same base class, and is defined by certain criteria which need to be met in order to execute the service. A trader maintains a reference to each available service application. When a certain service needs to be performed, a set of criteria for that certain service are evaluated by the trader, and a particular one of the service applications within the service layer defined to meet the criteria set is selected. The selected service application is then invoked to support the certain service. Following termination of the invoked service application, the service is shut down in a controlled fashion.

24 Claims, 2 Drawing Sheets

U.S. PATENT DOCUMENTS

| | | | |
|---|---|---|---|
| 5,864,862 | * | 1/1999 | Kriens et al. ......................... 707/103 |
| 5,928,335 | * | 7/1999 | Morita ................................. 709/303 |
| 5,995,945 | * | 11/1999 | Notani et al. .......................... 705/28 |
| 6,032,199 | * | 2/2000 | Lim et al. ............................. 709/316 |
| 6,044,224 | * | 3/2000 | Radia et al. ........................... 717/10 |
| 6,049,819 | * | 4/2000 | Buckle et al. ....................... 709/202 |

* cited by examiner

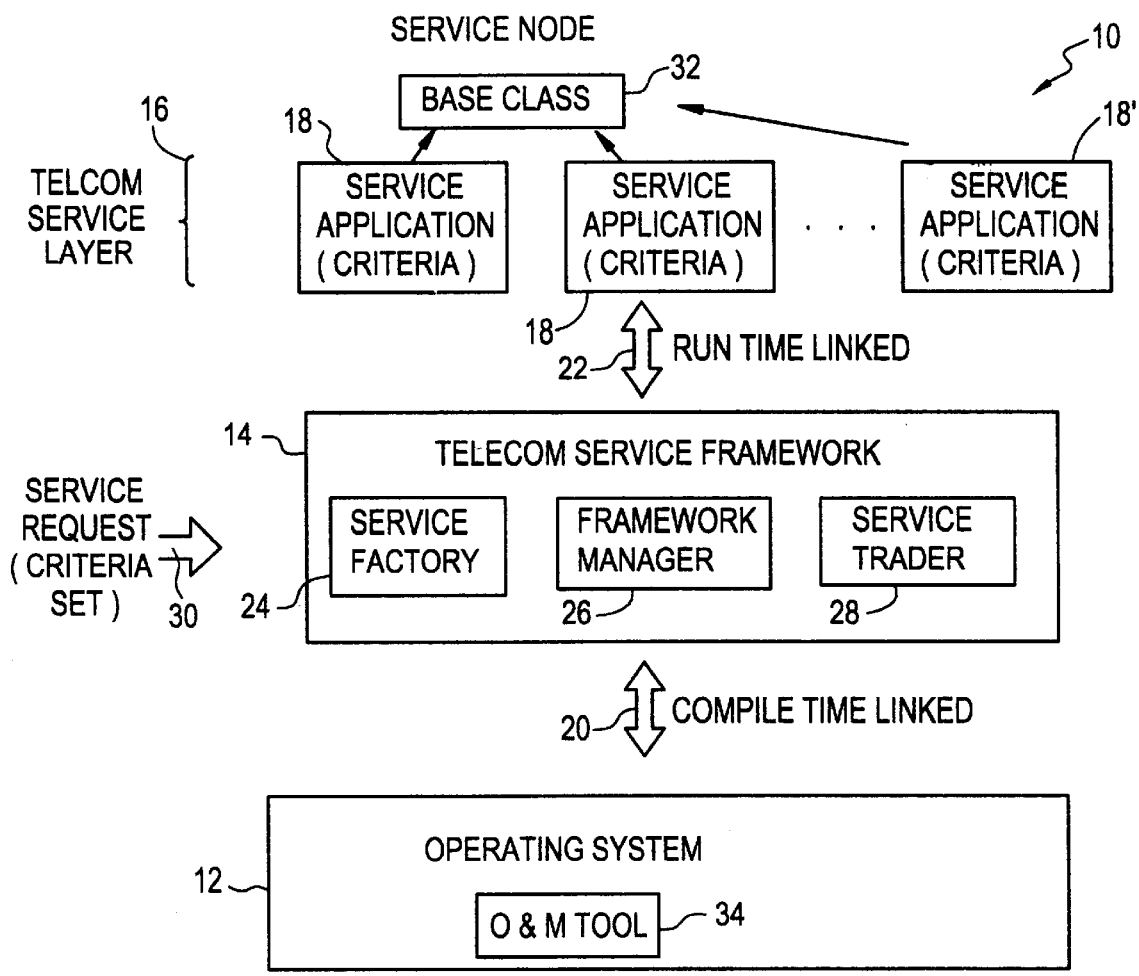
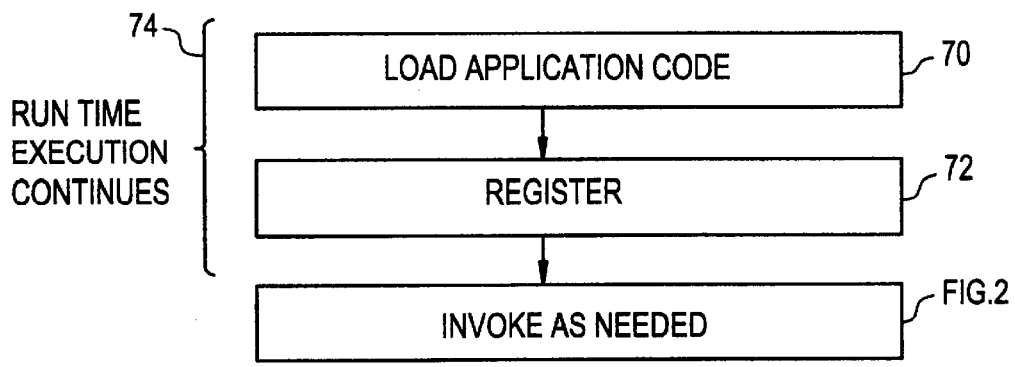

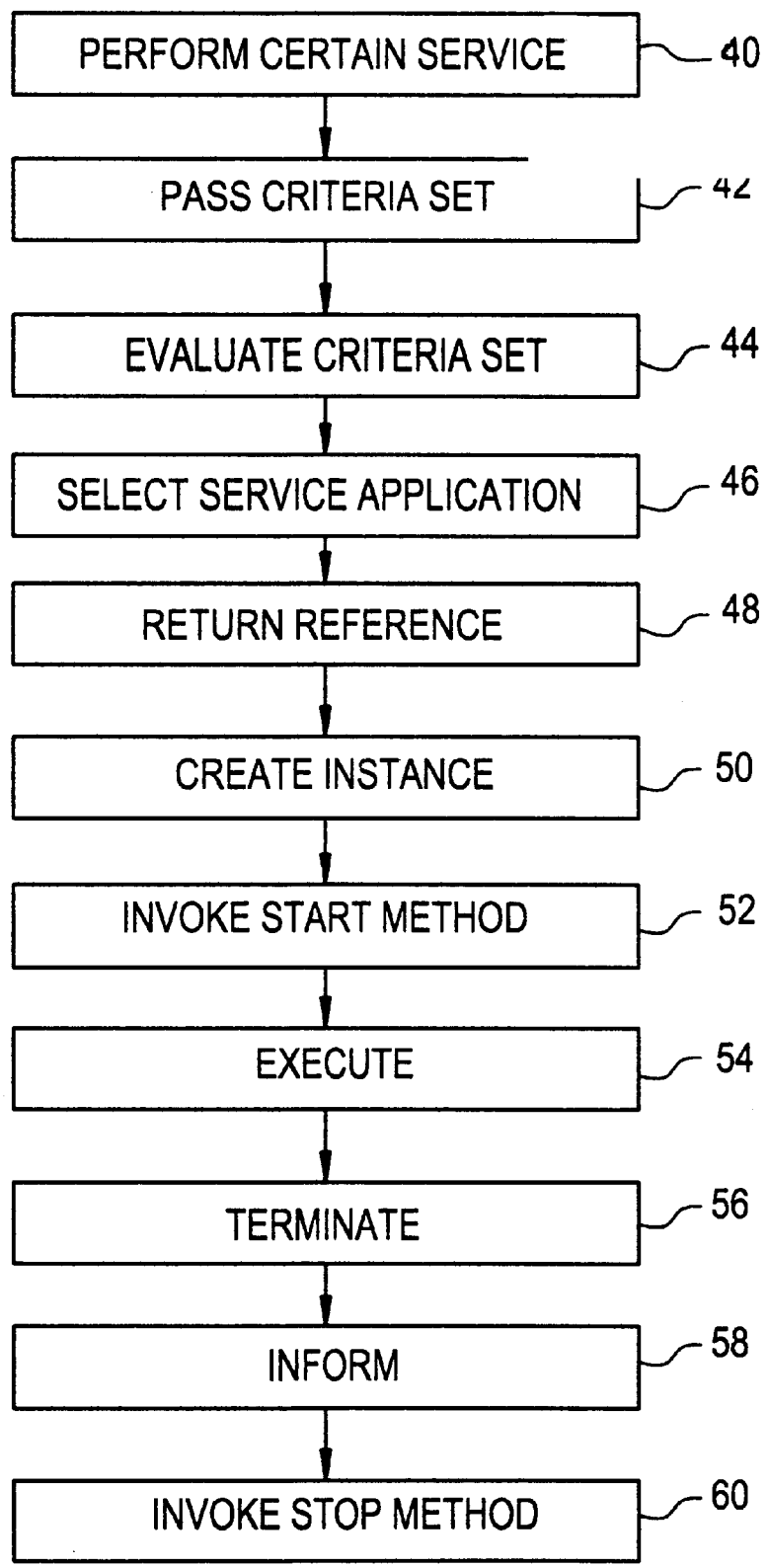

METHOD AND APPARATUS FOR INTRODUCING AND MODIFYING TELECOMMUNICATIONS SERVICES

BACKGROUND OF THE INVENTION

1. Technical Field of the Invention

The present invention relates to the introduction or modification of service applications within a telecommunications service node.

2. Description of Related Art

In stand-alone or batch computer processing systems, introducing or modifying software (such as is experienced with a version change) presents relatively few difficulties and obstacles. Any applications currently being executed by the supporting computing systems are first terminated, and then the new software application (comprising, perhaps, a new version of an existing application) is loaded onto the system. The necessary applications for system operation are then restarted, and all future data processing operations may be performed using the newly introduced application.

The introduction or modification operation becomes much more problematic in connection with computer processing systems where necessary system operation related applications cannot be terminated for the period of time required for completion of the software introduction or modification. Take, for example, modern stored program control (SPC) telecommunications switches or service nodes like mobile switching centers (MSCs), exchanges, home location registers (HLRs) or service control points (SCPs). Ideally, these types of computer processing systems run perpetually without interruption because of the continuous need for providing communications services to users. More specifically, there is a continuous flow of communications traffic (i.e., calls) being processed through the system, even at off hours of the day and night. Disruptions in service handling, such as would occur if the system were taken off-line in connection with a software introduction or modification, cannot therefore be tolerated.

Call handling service within a telecommunications stored program control node is provided by a number of separately developed service applications. In this regard, a "service" in this context refers to any one of a number of supported operations ranging from a handler for responding to a certain received message (such as a mobile application part (MAP) message handler) to a subscriber based service (such as a flexible call forwarding service). Although each of these "services" is developed separately, all portions that inter-operate must be linked for execution. Linking involves the combination of the various programs for the needed services into a composite program. Linking can, in theory, be accomplished at a number of different times including both before and after loading, and both before and at execution.

Typically, with respect to prior art SPC telecommunications nodes, service programs are linked at the same time they are compiled. These services are thus referred to as being "compile time linked." When a given service for the telecommunications node is subsequently newly introduced or modified, all of the inter-operable service applications must be recompiled and relinked, with the resulting recompiled software substituted (i.e., swapped) for the existing software while call handling service continues, in an uninterrupted fashion, to be provided.

One known mechanism for transitioning during run-time execution between an old compiled software and a new recompiled software loads both versions of the software onto the system and then functions to redirect traffic from the old software to the new software in a gradual manner (perhaps starting with test traffic). Transactions begun with an application or service of the old software are allowed to process to completion using that old software. Transactions begun after loading of the new software are processed by the new software. When the operator is satisfied with new software operation, and all the old software handled transactions are completed, the old software is removed.

To obviate the need for completely recompiling and relinking the software, as well as obviate the need to swap old and new versions of the compiled and linked entire set of software modules during run time execution, the prior art further suggests delaying linking of block programs in SPC telecommunications nodes such that linking is performed in a dynamic fashion at the time of block execution. Software addresses within a modular software system are dynamically linked as the individual software modules are executed. Thus, binding of variables and signals within the software is delayed until such time, during execution, when a given module is actually executed.

SUMMARY OF THE INVENTION

A telecommunications service node includes a multi-level architecture comprising an operating system layer, a service framework layer and a service application layer. The operating system and service framework layers are interfaced by an object oriented, compile time linked interface. The service framework and service application layers are interfaced by an object oriented, run time linked interface. Run time linking of the object oriented service applications within the service application layer supports the introduction or modification of service applications during run time execution of the service node. Each service application inherits from the same base class, and is defined by certain criteria which need to be met in order to execute the service.

A trader within the service framework layer maintains a reference to each available service application within the service application layer. When a certain service needs to be performed, a set of criteria for that certain service are evaluated by the trader, and a particular one of the service applications within the service layer defined to meet the criteria set is selected. The selected service application is then invoked and executes whatever operations it is designed to perform in supporting the certain service. Following termination of the invoked service application, the service is shut down in a controlled fashion.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 1 is an architecture block diagram for a telecommunications service node of the present invention;

FIG. 2 is a flow diagram illustrating operation of the service node of FIG. 1 in providing a service; and FIG. 3 is a flow diagram illustrating operation of the service node of FIG. 1 in introducing or modifying a service.

DETAILED DESCRIPTION OF THE DRAWINGS

Reference is now made to FIG. 1 wherein there is shown an architecture block diagram for a telecommunications service node 10 of the present invention. The telecommunications service node 10 may comprise, for example, a telecommunication switch (exchange) like a mobile switching center (MSC), a home location register (HLR) or a service control point (SCP). The architecture of the service node 10 includes a plurality of layers. A first layer comprises an operating system layer 12. A second layer comprises a telecommunications service framework layer 14. A third layer comprises a telecommunications service layer 16 defined by a number of service applications (programs) 18. The service applications 18 may comprise mobile application part (MAP) message handlers or conventional subscriber related telecommunications service features. The telecommunications service framework layer 14 functions as a buffer between the operating system layer 12 and each of the service applications 18 within the service layer 16. A first interface 20 is provided between the operating system layer 12 and the telecommunications service framework layer 14. This first interface 20 comprises a compile time linked interface (preferably implemented in an object oriented language such as C++). A second interface 22 is provided between the telecommunications service framework layer 14 and each of the service applications 18 within the service layer 16. This second interface 22 comprises a run time linked interface (preferably also implemented in an object oriented language such as C++, and comprising, for example, a common object request broker architecture (CORBA) interface, CORBA interface description language (IDL) interface, a linked procedure call interface, or a Microsoft common object model (COM) interface). The architecture accordingly follows a client-server model, with the framework comprising the client and the telecommunications services comprising the servers. To the extent CORBA is utilized, many of CORBA's processing attributes (such as, for example, local/remote transparency, static/dynamic invocations, polymorphic messaging and language/system independence) may be beneficially used.

The use of a run time linked second interface 22 allows for increased flexibility in the way services are started. Furthermore, run time linking supports delaying, from compile time to run time, the selection of which one of a plurality of available services are to be used for handling a given received message. There are numerous benefits to this type of architecture. For example, a number of different service applications 18 (i.e., service handlers) can be supported within the service layer 16 to serve the same message. This allows the service node 10 to provide a differentiation in services provided to plural service providers. Thus, each service provider may specify their own specialized services, custom parameters or custom settings to be implemented. As a further example, a new service application 18' may be introduced into a service node 10 that was unaware of the service when it was originally compiled.

The telecommunications service framework layer 14 includes a service factory 24, a framework manager 26 and a service trader 28. The service factory 24 is an object used to create an appropriate service to execute. The framework manager 26 handles housekeeping tasks and communications supervision (e.g., interfacing outside the service node 10) on behalf of the service applications 18. The service trader 28 is an agent utilized by the service framework layer 14 to appropriately and correctly reference the service applications 18. The service trader 28 maintains a reference to each of the service applications 18 that are available in the telecommunications service layer 16.

Reference is now additionally made to FIG. 2 wherein there is shown a flow diagram illustrating operation of the service node 10 of FIG. 1 in providing a service. When the service factory 24 wants a certain service to be performed (step 40), for example, in response to receipt of a service request 30 (like a MAP message or a signal triggering provision of a subscriber service feature), a set of criteria (included with the request) are passed to the service trader 28 (step 42). Examples of the criteria passed to the service trader 28 in this telecommunications service node related implementation include: identification of the subscriber (e.g., MIN, IMSI and the like); identification of the protocol to be used (e.g., MAP, ANSI-41, and the like); identification of the revision for the protocol to be used (e.g., rev. A, rev. B, and the like); and, identification of the service provider for the subscriber at issue (e.g., AT&T, CANTEL, and the like). The service trader 28 evaluates the passed set of criteria in view of the desired certain service (step 44), selects a particular one of the service applications 18 within the service layer 16 that is to be invoked (step 46), and returns to the service factory 24 with a reference to that service application (step 48). The service factory 24 then creates an instance of the service application 18 (step 50) and invokes its start method (step 52). Each of the service applications 18 inherit from the same base class 32, wherein that base class defines certain basic characteristics for the services (such as, for example, the methods for starting and stopping the services, and the methods for issuing and receiving reports of events with respect to other services). To the extent CORBA is utilized, its dynamic interface invocation (DII) mechanism allows the service framework layer 14 to discover, at run-time, how to use a service application 18. The service application 18 then executes whatever operations it is designed to perform (step 54). The nature of these executed operations is of no concern to the service factory 24. To the extent the service application 18 needs to communicate external to the service node 10 (e.g., with other nodes), the service framework layer 14 through its framework manager 26 provides the interface(s) for those communications in accordance with the base class 32 defined methods for event reporting. When execution of the invoked service application 18 operations terminates (step 56), the service factory 24 is informed (step 58) and it then takes the necessary steps to shut down the service in a controlled fashion by invoking its stop method (step 60).

Reference is now additionally made to FIG. 3 wherein there is shown a flow diagram illustrating operation of the service node 10 of FIG. 1 in introducing or modifying a service. The programming code for newly introduced or modified service application 18' is loaded into the service node 10 (step 70). It is important to note here that the service application 18' inherits from the same base class 32 as the existing service applications 18. Using an operation and maintenance (O&M) tool 34 provided by the operating system layer 12, the service application 18' is registered into the service trader 28 (step 72) along with an identification of the criteria (subscriber ID, protocol ID, revision ID, service provider ID, and the like) which need to be met in order to execute the service. The service application 18' is then ready to be invoked in the manner discussed above with respect to FIG. 2. No prior linking or binding of the service application 18' with the other service applications 18 within the service layer 16 or the operating system layer 12 and the telecommunications service framework layer 14 need be performed. Furthermore, the processes of steps 70 and 72 advantageously occur while the service node 10 continues its run time execution and handling of transactions (step 74). No execution stoppages, system-wide recompiles, or wholesale software swapping is required.

Two important features of the service node 10 are that each of the implemented service applications 18 within the service layer 16 are programmed using object oriented techniques, and inherit from the same base class 32. Because of these features, the second interface 22 supports "type safe" invocations of the loaded service applications 18. One primary advantage of this is that no interface definition language need be specified to allow for communication across the second interface 22. The use of such an interface definition language is thus optional, with the selection choice left up to the implementor. The methods for starting, stopping, communicating, reporting, replying, and the like are treated in the same way for all service applications. Another advantage is that with publication of the second interface 22 description, third party vendors may develop newly introduced or modified service applications 18' (using well known object oriented programming techniques) that can not only be easily introduced to the service node 10 during run time execution (see, FIG. 3), but also be compatible with existing service applications 18 and their execution (see, FIG. 2).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An architecture for a telecommunications service node, comprising:
    an operating system layer;
    a telecommunications service framework layer;
    a telecommunication service layer including a plurality of object oriented telecommunications service applications;
    a first interface between the operating system layer and the telecommunications service framework layer, the first interface comprising an object oriented, compile time linked interface;
    a second interface between the telecommunications service framework layer and each of the service applications within the telecommunications service layer, the second interface comprising an object oriented, run time linked interface;
    wherein run time linking of the telecommunications service applications through the second interface supports introduction or modification of telecommunications service applications within the telecommunications service layer during run time execution of the telecommunications service node.

2. The architecture of claim 1 wherein the telecommunications service framework layer includes a service trader comprising an agent operating to respond to a telecommunications service request made to the telecommunications service node by referencing for invocation one of the telecommunications service applications.

3. The architecture of claim 2 wherein the service trader maintains a reference to each of the telecommunications service applications that are available within the telecommunications service layer.

4. The architecture of claim 2 wherein each telecommunications service application within the telecommunications service layer is defined by certain criteria, and wherein the service request includes a set of criteria, the operation of the service trader in referencing comprising an identification of the one of the telecommunications service applications whose defined certain criteria meet the service request set of criteria.

5. The architecture of claim 4 wherein a given service to be provided may be provided by plural ones of the telecommunications service applications comprising variations of a basic service application, the service trader selecting, from among the plural ones of the telecommunications service applications, the referenced telecommunications service application based upon the meeting of variation related service request set of criteria.

6. The architecture of claim 2 wherein the telecommunications service framework layer includes a service factory for creating an instance of the telecommunications service application referenced by the service trader and invoking necessary base class defined methods for executing the telecommunications service for provision by the telecommunications service node.

7. The architecture of claim 1 wherein the second interface comprises a common object request broker architecture (CORBA) specified interface.

8. The architecture of claim 7 wherein the common object request broker architecture (CORBA) specified interface comprises an interface description language (IDL) interface.

9. The architecture of claim 1 wherein the second interface comprises a linked procedure call type interface.

10. The architecture of claim 1 wherein the second interface comprises a common object model (COM) interface.

11. The architecture of claim 1 wherein the telecommunications service node comprises one of the following:
    a home location register;
    a service control point; and
    a telecommunications exchange.

12. The architecture of claim 1 wherein the telecommunications service applications comprise mobile application part message handlers.

13. The architecture of claim 1 wherein the telecommunications service applications comprise subscriber related telecommunications service features.

14. The architecture of claim 1 wherein each of the plurality of object oriented telecommunications service applications inherit froma same base class.

15. A method for introducing or modifying telecommunications service applications stored in a telecommunications service node, comprising the steps of:
    loading a newly introduced or modified object oriented telecommunications service application onto the telecommunications service node, wherein the newly introduced or modified object oriented telecommunications service application inherits from a same base class as other existing and previously loaded object oriented telecommunications service applications, each loaded telecommunications service application defined by certain criteria;
    registering the certain criteria for the newly introduced or modified object oriented telecommunications service application for future evaluation in referencing one of the telecommunications service applications whose defined certain criteria meet a telecommunications service request specified set of criteria; and
    performing the steps of loading and registering during run time execution of the telecommunications service node.

16. The method of claim 15 wherein the telecommunications service node comprises one of the following:
    a home location register;
    a service control point; and
    a telecommunications exchange.

17. The method of claim 15 wherein the telecommunications service applications comprise mobile application part message handlers, and the telecommunications service request comprises a mobile application part message.

18. The method of claim 15 wherein the telecommunications service applications comprise subscriber related telecommunications service features, and the telecommunications service request comprises a signal for triggering provision of a subscriber related telecommunications service feature.

19. The method of claim 15 wherein a given service to be provided may be provided by plural ones of the telecommunications service applications comprising variations of a basic service application, a selecting of the referenced telecommunications service application from among the plural ones of the telecommunications service applications being based upon the meeting of variation related service request set of criteria.

20. A method for operating a telecommunications service node in providing services, comprising the steps of:

loading a plurality of object oriented telecommunications service applications which each inherit from a same base class, each telecommunications service application defined by certain criteria;

responsive to a telecommunications service request identifying a set of criteria, referencing one of the telecommunications service applications whose defined certain criteria meet the service request set of criteria;

creating an instance of the referenced telecommunications service application; and invoking necessary base class defined methods for executing the telecommunications service through the referenced telecommunications service application.

21. The method of claim 20 wherein the telecommunications service node comprises one of the following:

a home location register;

a service control point; and a telecommunications exchange.

22. The method of claim 20 wherein the telecommunications service applications comprise mobile application part message handlers, and the telecommunications service request comprises a mobile application part message.

23. The method of claim 20 wherein the telecommunications service applications comprise subscriber related telecommunications service features, and the telecommunications service request comprises a signal for triggering provision of a subscriber related telecommunications service feature.

24. The method of claim 20 wherein a given service to be provided may be provided by plural ones of the telecommunications service applications, and the step of referencing comprises the step of selecting the referenced telecommunications service application from among the plural ones of the telecommunications service applications being based upon the meeting of the service request set of criteria.

* * * * *